(12) United States Patent
Lubbers et al.

(10) Patent No.: US 7,149,769 B2
(45) Date of Patent: Dec. 12, 2006

(54) SYSTEM AND METHOD FOR MULTI-DESTINATION MERGE IN A STORAGE AREA NETWORK

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 10/106,907

(22) Filed: Mar. 26, 2002

(65) Prior Publication Data

US 2003/0187947 A1 Oct. 2, 2003

(51) Int. Cl.
*G06F 15/16* (2006.01)
*G06F 7/00* (2006.01)
*G06F 12/00* (2006.01)

(52) U.S. Cl. .................. 709/201; 709/218; 709/219; 707/10; 707/202

(58) Field of Classification Search ........ 709/213–219, 709/226, 201; 707/201–206, 10
See application file for complete search history.

(56) References Cited

U.S. PATENT DOCUMENTS

| | | | |
|---|---|---|---|
| 5,533,190 A | 7/1996 | Binford et al. | |
| 5,721,918 A | 2/1998 | Nilsson et al. | |
| 5,893,155 A | 4/1999 | Cheriton | |
| 6,041,423 A | 3/2000 | Tsukerman | |
| 6,052,797 A * | 4/2000 | Ofek et al. | 714/6 |
| 6,148,368 A | 11/2000 | DeKoning | |
| 6,178,427 B1 * | 1/2001 | Parker | 707/202 |
| 6,185,663 B1 | 2/2001 | Burke | |
| 6,226,651 B1 * | 5/2001 | Masuda et al. | 707/202 |
| 6,275,783 B1 | 8/2001 | Okamura | |
| 6,389,552 B1 * | 5/2002 | Hamilton et al. | 714/4 |
| 6,594,676 B1 * | 7/2003 | Moore | 707/202 |
| 6,606,694 B1 * | 8/2003 | Carteau | 711/162 |
| 6,732,123 B1 * | 5/2004 | Moore et al. | 707/202 |

OTHER PUBLICATIONS

Software Product Description, Compaq SANworks Virtual Replicator-Version 2.0, SPD: 70.41.02, Jun. 5, 2000, pp. 1-5, Compaq Computer Corporation.

(Continued)

*Primary Examiner*—Ario Etienne (57) ABSTRACT

A data storage system adapted to maintain redundant data storage sets at a destination location(s) is disclosed. The data storage system establishes a copy set comprising a source volume and a destination volume. Data written to a source volume is automatically copied to the destination volume. The data storage system maintains a data log that may be activated when the destination volume is inaccessible due to, for example, a malfunction in the destination storage system or in the communication link between the source system and the destination system. I/O commands and the data associated with those commands are written to the data log, and after a destination system becomes available the information in the data log is merged into the destination volume to conform the data in the destination volume to the data in the source volume. The data log competes for disk capacity with other volumes on the system, and log memory is allocated as needed. If multiple remote sites are provided, then the system permits to implements a merge fence to manage the process of merging data into multiple destinations.

12 Claims, 8 Drawing Sheets

OTHER PUBLICATIONS

Features and Benefits of HSG80 ACS 8.6P Data Replication Manager, Oct. 2001, pp. 1-22, Compaq White Paper, Enterprise Storage Group, Compaq Computer Corporation.

Information Systems—dpANS Fibre Channel Protocol for SCSI, revision 012, Dec. 4, 1995, pp. i-63, American National Standard-draft.

Information Technology- Fibre Channel Protocol for SCSI, second version (FCP-2), Nov. 1, 2001, pp. ii-133, American National Standard-draft.

Elkington, Susan, Enterprise Project, Data Replication Manager Functional Specification for VCS V3 Release, Compaq Computer Corporation, Nov. 30, 3001, pp. 1-68.

Hess, Randy and Korgaonkar, Anuja, Enterprise Project, DRM Logging, Compaq Computer Corporation, Nov. 25, 2001, pp. 1-12.

Hoffman, Brian, Enterprise Software Functional Specification V0.10, Compaq Computer Corporation, Jul. 25, 2001, pp. 1-26.

Multi-Directional Architectural Design, pp. 1-3.

Features and Benefits of HSG80 ACS 8.6P Data Replication Manager, COMPAQ White Paper, Oct. 2001, Enterprise Storage Group, Compaq Computer Corporation, pp. 1-15.

Storage Virtualization and the *StorageWorks* Enterprise Virtual Array, COMPAQ White Paper, Sep. 2001, Enterprise Storage Array Division Marketing, Compaq Computer Corporation, pp. 1-13.

SCSI-2 Spec—Logical characteristics, http://www.uni-mainz.de/~koenig/scsi/SCSI2-06.html, Mar. 8, 2002, pp. 3-31.

Understanding Replication in Databases and Distributed Systems, Jul. 13, 1997, Computer Based Learning Unit, University of Leeds, pp. 1-26.

ENSA-2 *VersaStor* Virtualization Technology, Enterprise Storage Group, *Storage Works* by COMPAQ White Paper, Dec. 2001, Compaq Computer Corporation, pp. 1-10.

NCITS T10, Project 1144D, Revision 07a, Nov. 1, 2001, pp. 8-26.

StorageWorks by Compaq Enterprise Virtual Array, QuickSpecs, World Wide- version 5, Feb. 27, 2002, pp. 1-12.

T10/98-203 revision 0, Persistent Reservations, Jul. 7, 1998, pp. 1-20.

iSCSI: ISID and the New Persistent Reservations Proposals, http://www.pdl.cmu.edu/mailinglists/ips/mail/msg07055.html, Mar. 19, 2002, pp. 1-4.

\* cited by examiner

SYSTEM AND METHOD FOR MULTI-DESTINATION MERGE IN A STORAGE AREA NETWORK

BACKGROUND OF INVENTION

1. Field of the Invention

The present invention relates generally to computer-based information storage systems, and more specifically, to systems and methods for managing data merging processes in a Storage Area Network.

2. Background

Recent years have seen a proliferation of computers and storage subsystems. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability.

Mass data storage systems are implemented in networks or fabrics that provide means for communicating data between systems that use data, and the storage systems that implement the physical storage. In many cases, host computers act as storage servers and are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. A large storage system can be formed by collecting storage sub-systems, where each subsystem is managed by a separate server.

More recently, virtualized storage systems such as the Storageworks Enterprise Virtual Array announced by Compaq Corporation in October, 2001 provide storage controllers within a fabric or network that present virtualized storage to hosts that require data storage in a manner that enables the host to be uninvolved in the physical configuration, allocation and management of the storage devices. In this system, hosts simply access logical units of storage that appear to the host as a range of logical address space. Virtualization improves performance and utilization of storage.

SAN systems enable the possibility of storing multiple copies or "replicas" of data at various physical locations throughout the system. Data replication across multiple sites is desirable for a variety of reasons. To provide disaster tolerance, copies of data stored at different physical locations is desired. When one copy becomes unavailable due to equipment failure, a local network outage, natural disaster or the like, a replica located at an alternate site can allow access to the data. Replicated data can also theoretically improve access in normal operation in that replicas can be accessed in parallel, avoiding bottlenecks associated with accessing a single copy of data from multiple systems.

However, prior storage systems were organized such that one site had a primary role and another site was a replica. Access requests were handled by the primary site until failure, at which time the replica became active. In such an architecture, the replica provided little benefit until failure. Similarly, the resources allocated to creating and managing replicas provided minimal load balancing benefit that would enable data access requests to be directed intelligently to replicas such that resources were used more efficiently. Moreover, when multiple replicas are distributed throughout a network topology, it would be beneficial if network delays associated with accessing a topologically remote storage subsystem could be lessened.

It is desirable to provide the ability for rapid recovery of user data from a disaster or significant error event at a data processing facility. This type of capability is often termed 'disaster tolerance'. In a data storage environment, disaster tolerance requirements include providing for replicated data and redundant storage to support recovery after the event. In order to provide a safe physical distance between the original data and the data to backed up, the data is migrated from one storage subsystem or physical site to another subsystem or site. It is also desirable for user applications to continue to run while data replication proceeds in the background. Data warehousing, 'continuous computing', and enterprise applications all benefit from remote copy capabilities.

Compaq Corporation introduced an array controller referred to as the HSG80, that implemented Data Replication Management features, as described in U.S. patent application Ser. No. 09/539,745 assigned to the assignee of the present application and incorporated herein by reference, that implemented an architecture utilizing redundant storage controllers. While effective, each of the controllers comprised one port that was dedicated to user data, and a separate port that was dedicated to data replication functions. In general, the HSG80 architecture defined relatively constrained roles for each network element. That is to say, data replication was managed between a defined pair of sites, where one element of the pair was designated in a primary role, and the other element of the pair was designated in a replica role. Despite the fact that each controller had two ports for communicating with other controllers, one of the ports was constrained in the role of handling user data, and the other port was constrained in the role of handling data replication. While easing implementation, these designated roles limited the flexibility and functionality with which the data replication could be performed.

Similarly, prior data replication management solutions simplified the management problems by assigning fixed roles to storage locations. A particular storage site would be designated as a primary when it handled operational data traffic, and another site would be designated only as a secondary or backup site. Such architectures were unidirectional in that the backup site was not available for operational data transactions until the failure of the primary site. Such rigidly assigned roles limited the ability to share storage resources across diverse users and applications. Moreover, configuration of such systems was complex as it was necessary to access and program storage controllers at both the primary and secondary sites specifically for their designated roles. This complexity made it impractical to expand data replication to more than two sites.

Therefore, there remains a need in the art for a data storage system capable of providing flexible data replication services without the direct involvement of the host computer. Moreover, a data storage system is needed that is readily extensible to provide multiple replication, load balancing, and disaster tolerance without limitations imposed by designating rigid roles for the system components.

SUMMARY

The present invention addresses these and other needs by providing, in one aspect, a data storage system adapted to maintain redundant data storage sets at a remote location(s). The data storage system establishes a copy set comprising a source virtual disk and a destination virtual disk. Data written to a source virtual disk is automatically copied to the destination virtual disk. The data storage system maintains a data log that may be activated when the destination virtual disk is inaccessible due to, for example, a malfunction in the destination virtual disk or in the communication link between the source virtual disk and the destination virtual disk. I/O commands and the data associated with those commands are written to the data log, and after destination virtual disk becomes available the information in the data log is merged into the destination virtual disk to conform the data in the destination virtual disk to the data in the source virtual disk. The data log competes for disk capacity with other volumes on the system, and log capacity is allocated as needed. If multiple remote sites are provided, then the system permits to implements a merge fence to manage the process of merging data into multiple destinations.

In one aspect, the invention provides a method for writing information in a data log to one or more destinations in a storage network, wherein the data log is generated by a source controller in response to the failure of one or more destinations in the storage network, and wherein each write I/O from a host computer is assigned a GSN that is stored with the data entry corresponding to the write I/O. The method comprises the steps of setting a merge fence to the lowest GSN of the destination databases; writing entries from the data log, beginning at the merge fence, to each active destination and for which the lowest GSN is equal to the merge fence; and incrementing the merge fence after each write.

In another aspect, the invention provides a computer program product for use in connection with a processor for writing information in a data log to one or more destinations in a storage network, wherein the data log is generated by a source controller in response to the failure of one or more destinations in the storage network, and wherein each write I/O from a host computer is assigned a GSN that is stored with the data entry corresponding to the write I/O. The computer program product comprises logic instructions, executable on a processor, for setting a merge fence to the lowest GSN of the destination databases; logic instructions, executable on a processor, for writing entries from the data log, beginning at the merge fence, to each active destination and for which the lowest GSN is equal to the merge fence; and logic instructions, executable on a processor, for incrementing the merge fence after each write.

BRIEF DESCRIPTION OF THE DRAWINGS

The above objects, features and advantages of the present invention will become more apparent from the following detailed description taken in conjunction with the accompanying drawings, in which.

DETAILED DESCRIPTION

The present invention involves a data replication system in which data is replicated such that it is stored in two or more locations, and which employs mechanisms to ensure that write operations received by any location are performed in each location in the order in which they were received. While the present invention is particularly useful in a data replication system implemented in a storage area network (SAN), it has utility in any application in which operations must be implemented in order across distributed systems and devices.

The present invention is specifically described in terms of a protocol layer implemented on top of or within a standard communication protocol such as fibre channel. However, other transmission protocols may be used instead of fibre channel. The particular examples illustrate the invention in terms of a storage area network (SAN) comprising dual controllers attached over a redundant fibre channel fabric, with at least one other pair of controllers on the same fabric, over which data is replicated for multiple volumes simultaneously, in multiple directions, and with various degrees of synchronicity. However, the specific implementation may be varied significantly while achieving some or all of the benefits of the present invention.

The fibre channel structure is defined as a five-layer stack of protocols, where the five layers define the physical media and transmission rates, encoding scheme, framing protocol and flow control, common services, and the upper level application interfaces. FC-0, the lowest layer, specifies physical characteristics of the media, transmitters, receivers and connectors. FC-1 defines the 8B/10B encoding/decoding scheme used to integrate the data with the clock information required by serial transmission techniques. FC-2 defines the framing protocol for data transferred between ports as well as the mechanisms for using Fibre Channel's circuit and packet switched service classes and the means of managing the sequence of a data transfer. FC-2 is often referred to as the "link level". FC-3 is undefined and currently is not used. FC-4 provides integration of FC-2 level frames with existing standards and protocols such as FDDI, HIPPI, IPI-3, SCSI, Internet Protocol (IP), Single Byte Command Code Set (SBCCS), and the like.

Figure 1:
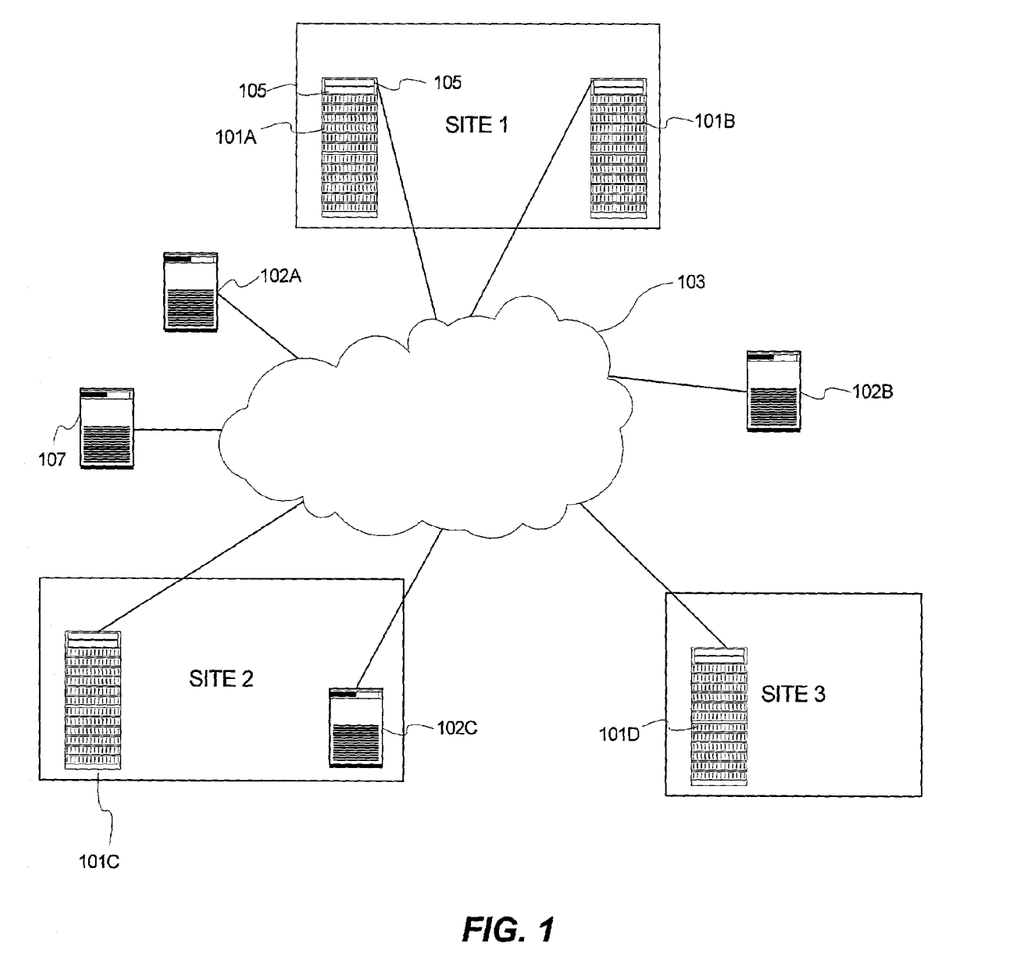
FIG. 1 shows a storage area network (SAN) environment in which the present invention is implemented.

FIG. 1 illustrates a multi-site storage area network (SAN) implementing features in accordance with present invention. In particular, the present invention relates to a protocol, including data structures and processes used to implement the protocol that enables communication between site 1, site 2, and site 3 for data replication operations. The example shown in FIG. 1 includes only three sites (Site 1, Site 2 and Site 3) to ease illustration and understanding. However, it should be understood that any number of sites might be provided to meet the needs of a particular application. The various sites may be physically proximate, or separated by an arbitrary distance. A particular implementation may well limit the number of possible sites, and may well limit the maximum or minimum physical separation of sites. Each site includes one or more storage cells 101, such as cells 101A, 101B, 101C and 101D. Any number of storage cells 101 may be included in any site, although the number implemented in any particular application may be constrained to meet the needs of that application.

The storage implemented at various sites is accessed by host computer 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than the reality that as consumers of data, the DRM system is preferably able to satisfy storage needs of host computers 102 at various physical and topological locations.

Storage cells 101 and hosts 102 couple to data communication network 103. Storage cells 101 implement a quantity of data storage capacity that is accessible through storage controllers 105 that implement one or more connections to network 101. Storage cells 101 typically implement hundreds of gigabytes to terabytes of physical storage capacity. Controllers 105 virtualize the physical storage capacity such that it is configurable into logical units (LUNs) of storage capacity. The LUNs implement an arbitrary quantity of logical address block storage, where each LUN has a specified level of data protection such as RAID 0–5 data protection. Hosts 102 access physical storage capacity by addressing read and write operations to specified LUNs, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, resizing LUNs, and other functions that maintain integrity and availability of the data stored therein.

Network 103 comprises any of a variety of available networks, and may comprise a plurality of interconnected networks. In particular examples, network 103 comprises at least two independent fibre channel fabrics to provide redundancy. These fibre channel fabrics may comprise long-distance connection mechanism such as asynchronous transfer mode (ATM) and Internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical location of SMAs 107 is arbitrary. SMAs 107 are preferably implemented at topological locations that provide redundant connections to the storage cells 101.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks. Redundancy provides connectivity in event of failure or degradation of some portions of network 103 (i.e., a link failure or connection failure). Redundancy also enables connectivity in event of failure or degradation of controllers 105 and/or interface components of hosts 102.

In the system of FIG. 1, it is important to realize that and storage cell 101 is able to function as a primary storage location for any of hosts 102, and at the same time function as a secondary or alternative storage location for a replica of data from another storage cell 101. This feature is referred to as "bi-directionality". Accordingly, each controller 105 is preferably enabled to generate and respond to the full set of commands defined by the data transfer protocol of the present invention as any storage cell 101 may be the source for a data replication group and so generate protocol messages that initiate creation of group members in other storage cells 101 and initiate write and copy operations to replicate data. Similarly, each storage cell 101 may be a destination or alternate site for a data replication group, and so respond to protocol commands from other storage cells to create data replication groups and member LUNs as well as to respond to write and copy commands to store replicated data from other storage cells 101. The write ordering mechanisms in accordance with the present invention are peer cooperative in that the behaviors required to complete a particular operation are managed in distributed fashion by all storage cells 101 participating in the operation.

Figure 2:
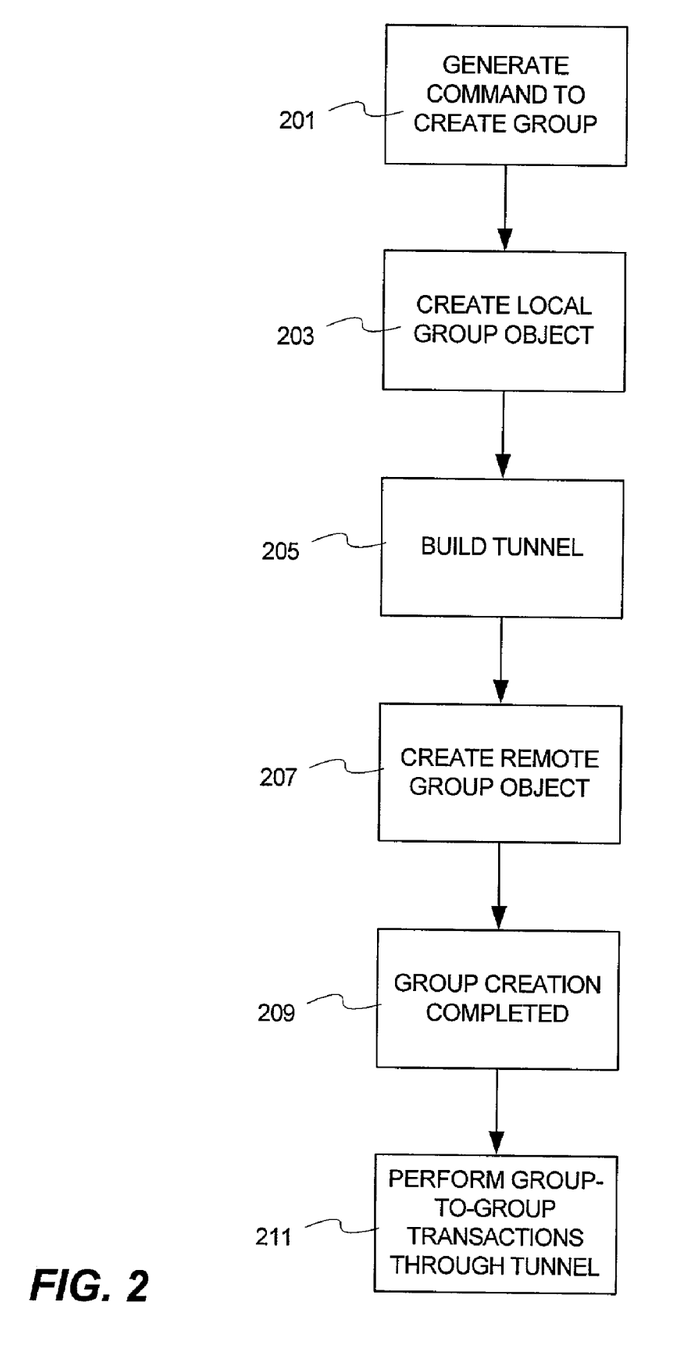
FIG. 2 illustrates in flow diagram form basic operations in accordance with the present invention.

FIG. 2 illustrates in flow-diagram form an overview of operations implemented by the data transfer protocol in accordance with the present invention used to establish a data replication group. Prior to formation of a data replication group a source LUN is established one site. That source LUN may be used for operational data transactions in a non-replicated fashion prior to establishing a data replication group. Alternatively, the source LUN may remain unused until the data replication group is formed. The designation of the initial LUN as a "source" has little meaning until a data replication group is formed, however, that terminology is used herein for consistency and ease of understanding.

At operation 201, a host, such as SMA 107, generates a command to create a data replication group. The host command identifies the previously created source LUN, and identifies one or more storage cells 101 that will be used for alternate sites for destination LUNs. The host command is directed to a specific controller 105 that is currently managing the previously created source LUN. At this point, destination LUNs do not exist at the alternate sites as they are created specifically to meet the requirements of the data replication group. In operation 203, the controller that receives the host command creates a local group object (e.g., object 505 in FIG. 5), which is a logical entity that represents the group in that controller. The group object 505 includes various methods to implement the data replication group behaviors, including the data transfer protocol of the present invention. Once created, the local group object 505 contains the source LUN.

In operation 205, a communication link called a tunnel is created. The tunnel is a communication link through fabric 103 that is used to communicate data replication management and data transfer operations for one or more DRM groups. A tunnel comprises of a set of resources (e.g., buffers) that are used to communicate between two controllers. Unlike a conventional SCSI over fibre channel exchange that is set up and taken down for each SCSI operation, the tunnel is self-renewing so that it persists over several operations. A physical link or path in fabric 103 may implement any number of tunnels to support data replication groups 505. Typically only one tunnel exists between any pair of source/destination pair of controllers, however, a tunnel can be formed in any available path that couples a source/destination pair of controllers 105.

Once a tunnel is created, the initial source controller sends a protocol message through the tunnel to the destination controller in operation 207 to cause the destination controller to create a remote group object. The remote group object is remote with respect to the initial source controller, but is, of course, local to the destination controller, as the designations of "remote and local" are determined from a particular perspective. Hence, the remote group object is substantially similar in construction and behavior as the local group object. The destination controller 105 generates a protocol message directed to the initial source controller 105 to indicate successful creation of the remote group object is successfully created in operation 209. At this point, a data replication group is formed and subsequent data operations in 211 to either member will result in replicated operations to the other member.

Several operations must be performed subsequent to formation of a remote group object to fully implement the data replication system at the remote site. For example, the source site will communicate information about the source LUN (such as its logical block capacity), and may communicate other information such as a desired data protection scheme for the destination LUN. Using this information, the remote group object can initiate the creation of a destination LUN that is suitable for replicating the source LUN.

Figure 3:
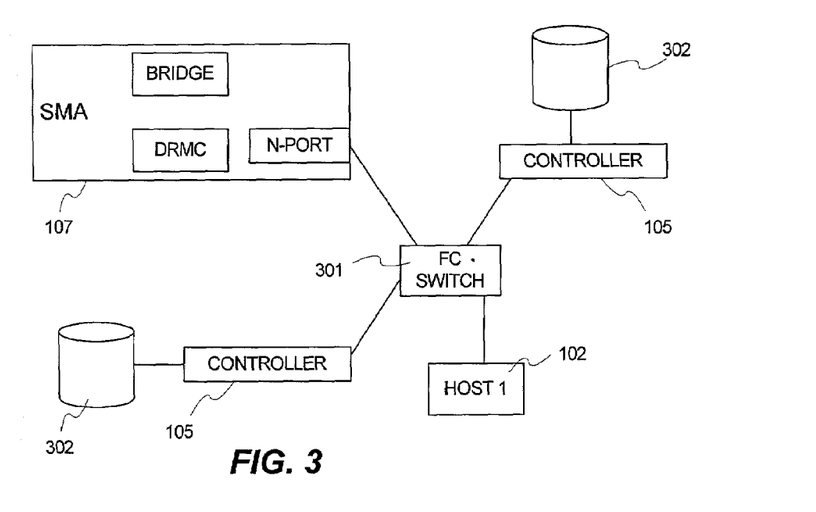
FIG. 3 illustrates a basic implementation of the present invention.

FIG. 3 illustrates various features of the present invention embodied in a basic configuration. In the particular implementation, storage management appliances (SMAs) 107 include a bridge and a data replication management console (DRMC) which are cooperative software processes that each present a user interface for configuration and monitoring of DRM processes. The Bridge functions as an element manager for controllers 105, and handles basic functions of connecting to the communication network 103, issuing commands to controllers 105, and implementing security policies. All customer configuration and monitoring of DRM activities goes through the bridge. The DRMC provides increased functionality over the bridge interface, by managing solely DRM storage and providing assists, such as with site recovery.

Physical storage devices 302 are coupled to controllers 105 by a high-speed redundant connection such as fibre channel arbitrated loop (FCAL) connections. An FCAL connection allows each of tens or hundreds of individual hard disk drives to be accessed not only at high speed, but also by more than one controller 105 in a storage cell. Further, by providing redundant FCALs, one FCAL can fail while each storage device 302 remains accessible by either controller. The present invention is largely independent of the specific implementation of physical storage devices 302, and it is contemplated that other physical storage architectures will provide suitable equivalents for purposes of the present invention.

Hence, although FIG. 3 shows only a single controller 105, it is contemplated that each storage cell is preferably configured with more than one controller 105 in a redundant fashion. Further, by providing redundant FCALs, one FCAL can fail while each storage device 302 remains accessible by either controller 105. Because ports of controllers 105 are configured to handle both operational data transactions and DRM traffic, a single port connection between each controller 105 and switch 301 is all that is necessary to implement data replication features of the present invention. However, the basic configuration shown in FIG. 3 sacrifices much redundancy, and would not be recommended for most applications, but is presented here to ease understanding of the present invention. It is important to understand that a great deal of flexibility exists in configuring the present invention for specific applications. Redundant connections and components can be added and removed flexibly to meet the needs of a particular application.

Figure 4:
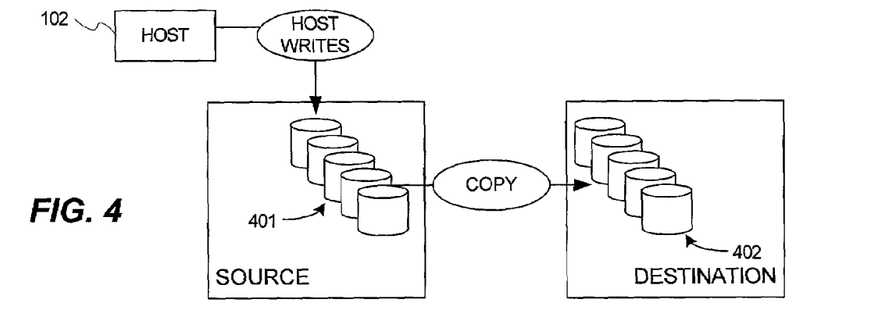
FIG. 4 shows data flow relationships in a data replication management operation in accordance with the present invention.

FIG. 4 shows hierarchical relationships defined in accordance with the present invention to model data replication management. Prior to performing DRM operations, a storage cell 101 is implemented at each site, and a virtual disk or LUN 401 is allocated within a storage cell 101 that is handing operational data with one or more hosts 102. For any particular copy set, one virtual disk 401 is designated as a source, although it should be understood that a source virtual disk 401 might be allocated at any site implementing the DRM features of the present invention. Virtual disk 401 may comprise a plurality of physical storage resources that span multiple physical drives within the storage cell 101, and may implement any desired capacity and data protection type.

A destination virtual disk 402 is allocated within a storage cell 101 at a designated alternative or destination site. In normal operation, write operations are directed to source virtual disk 401, and copied in a background process to one or more destination virtual disks 402. Destination virtual disk 402 has the same logical storage capacity as the source virtual disk, but may provide a different data protection configuration. In other words, destination disk 402 shares all of the dependent attributes of source virtual disk 401, but is not required to share any of the independent attributes of virtual disk 401. Controllers 105 of the destination storage cell handle the allocation of destination virtual disk 402 autonomously. This allocation involves creating data structures that map logical addresses to physical storage capacity, and in a particular implementation involve processes described in greater detail in U.S. patent application Ser. No. 10/040,194 entitled "SYSTEM AND METHOD FOR ATOMIZING STORAGE" which is assigned to the assignee of the present invention and incorporated herein by reference.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there is little or no manual procedures that must be performed to create new members for a copy set. This allows the copy set to increase (or decrease) its membership readily.

Figure 5:
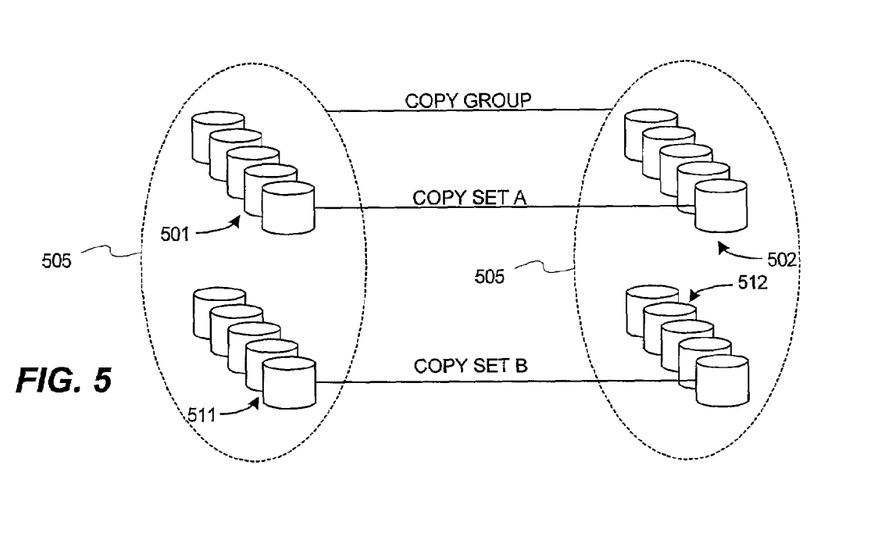
FIG. 5 illustrates logical relationships between data structures of the present invention.

In the preferred implementation, objects do not span sites or storage controllers. Instead, objects exist at each site and are associated with each other as suggested in FIG. 5. For instance, the controller 105 views a "DRM Group" 505 as a source group associated with a destination group (represented by a dashed-line oval in FIG. 5). The controller does not have a copy set object per se, rather group members (virtual disks) that are associated with remote members (virtual disks). The copy set is represented by this association. In FIG. 5, virtual disks 501 are associated with virtual disks 502 to form a copy set and virtual disks 511 are associated with virtual disks 512 to form another copy set.

DRM groups 505 comprises a set of related virtual disks or LUNs that belong to copy sets all of which have the same source and destination. Multiple groups 505 can exist for a given source and destination combination. While in one sense a group 505 spans sites, in practice a separate logical object that represents a group is implemented in each site (i.e., each controller 105 managing a group). Hence, in another sense each group 505 comprises a set of source halves of copy sets (i.e., the source LUNs 501 and 511), or destination halves of copy sets (i.e., destination LUNs 502 and 512). A group 505 is considered a "local group" by the controller 105 that implements the group logical object, and is considered a "remote group" when implemented by another controller 105. In other words, whether a group 505 is local or remote is determined from the perspective of a particular controller 105. A local group 105 is associated with a remote group 105 when the LUNs contained in each group are in the same copy set. In a multidirectional implementation, each local group 505 will be associated with a plurality of remote groups 105.

In essence, a group contains a collection of LUNS for which a combined I/O stream must be replicated in the LUNs of each remote group to provide certain properties with regard to its interruption (e.g. a copy set holding a database and a copy set holding a journal related to the database). DRM groups 505 are used for maintaining crash consistency and preserving WRITE ordering. Crash consistency refers operation in the event that a host 102 or link to a host 102 crashes during a data transaction. In such event, it is important that the data transaction be committed to all members of the group or fail in all members of the group. In a database/journal implementation, for example, it is important to prevent a situation in which the database is modified, but the journal does not reflect the modification, or vice versa. The consistency property applies when the group has more than one member. In general, more than one virtual disk should be added to a group only if the application requires it. In most cases, a group should comprise only one member for optimal performance, in which cases the crash consistency behaviors are less important.

An important feature of the data transfer protocol in accordance with the present invention is that it enables a group 505 to maintain write ordering among the members for during normal operation, as well as during asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, it is important that all replicas eventually implement the modification. Since multiple modification operations may be pending but uncommitted against a particular replica, it is necessary that the original order in which the modifications were presented is preserved when the pending modifications are applied to each replica. Even where asynchronous operation is not explicitly allowed, a destination LUN may become unavailable for a variety of reasons, in which case a copy set is implicitly operating in an asynchronous mode.

The data transfer protocol of the present invention associates a group sequence number or GSN with write operations as they are first captured within a site, and maintains the GSN association as the operations are transferred from site to site. The group sequence is a continuous, uninterrupted sequence because a GSN value is never applied to an operation that is volatile, and an operation is never made valid until the GSN association is complete. In this manner, each site (e.g., each group object) can rely on the GSN to uniquely identify each write operation and to indicate the order of that write operation with respect to all other write operations received by the controller.

In some configurations a group may include multiple peer sites such that each site can be an active handler of host I/O operations. Each controller maintains several GSN records to track the GSN sequence of write operations it sends to other controllers, and write operations it receives from other controllers. In these cases, the controller at each site maintains an independent GSN sequence for operations in which that controller is acting as a source controller, as well as a plurality of GSN sequences for each controller from which it receives write operations. In other words each group (at each location) persistently maintains one "gsn_use" value (representing the most recent GSN that has been applied to an operation for which it is a source), one "gsn_sent" value (representing the most recent GSN that has been successfully sent to another controller), a plurality of "gsn_receive" values (one for each peer controller, each value representing the most recent GSN that has been received from that controller) and a plurality of "$gsn_{13}$ received" values (one for each peer controller, each value representing the most recent GSN that has been successfully received into its mirror cache).

The GSN feature is very useful in recovery operations that involve retransmission of operations between controllers as a controller can immediately identify whether it has received an operation twice. The controller can then ignore duplicates and indicate that the operations were successful. The controllers do not need to exchange information about specific operations that were or were not received, nor rely on synchronized state information indicating completion status of each operation to each controller.

Figure 6:
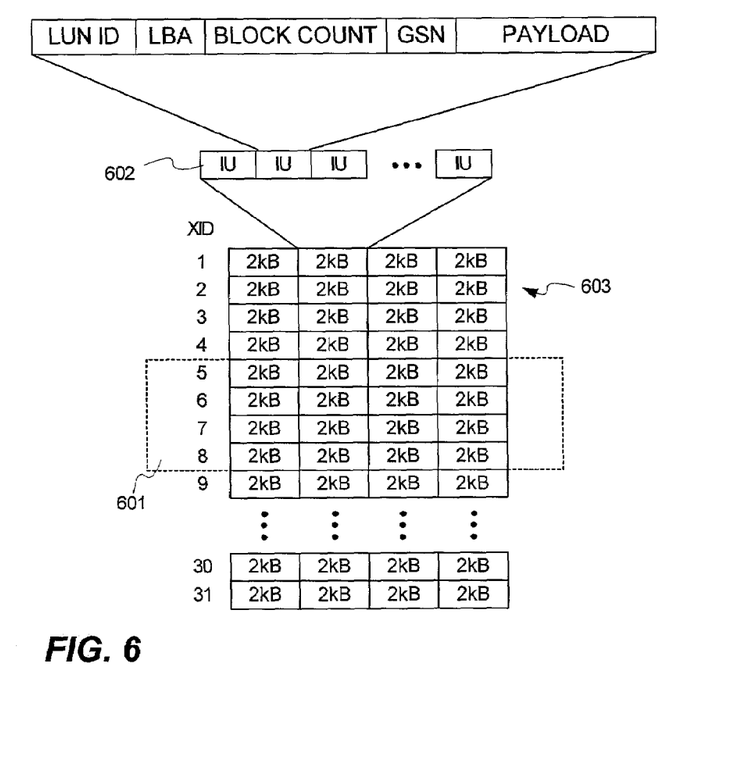
FIG. 6 illustrates an exemplary data structure used for storing and transmitting write operations in accordance with the present invention.

FIG. 6 shows a conceptual representation of a memory structure used to implement buffer resources. It should be understood that buffers are not actually allocated in memory address order and so is not physically an array, but is an array in the sense that each of the resources is identified by consecutive exchange ID values ($OX_{13}$ IDs). The data transmission part of the protocol is based on initializing the hardware at one end for a set of standard Fiber Channel "exchanges" as though each "exchange" were a SCSI read of a particular size (such as 4 KB or 16 KB). The set of "exchanges" is referred to as a "bundle". Each "exchange" is identified by a specific OX_ID than can be derived from the "tunnel index" and knowing the specific "bundle" involved. Sending data to a particular resource within a bundle involves setting up the hardware at the sending end to send a sequence of one or more Fiber Channel frames (with increasing data offsets when multiple frames are required) to the destination Fiber Channel address using the appropriate OX_ID. Acknowledgment by the receiver that the data was successfully received implies that the resource is available for further use in other transactions. Negative acknowledgment by the receiver indicates that the hardware has been re-armed to receive the data previously sent which was not correctly received. Transmission of data within a tunnel usually involves a specific "bundle" so that commands can specify exactly which resources by using schemes as simple as bit arrays (or bit masks). The precise "bundle" is inferred by the command operation code itself. In one implementation, the basic "bundle" is the "Message Frame Bundle". Both ends must have this "bundle" allocated and initialized. Each end may independently "activate" a "Write Resource Bundle" and/or a "Copy Resource Bundle" for use by the other end and at its request.

Once a tunnel is established, each controller has pre-allocated I/O resources for handling command-response (MFCs) exchanges with the other controller. These pre-allocated resources will continue to exist for the life of the tunnel. Each end of the tunnel sends data of a kind corresponding to the "bundle" involved—as if a SCSI Read command had been received with an OX_ID that can be inferred from the "tunnel index" and the "bundle" and resource identified. In a sense, the end that is sending data behaves as if it was responding to a just-received SCSI Read command, although the protocol does not require a corresponding SCSI Read command and the commands that set up the resource on the receiving end were transmitted independently of the instant transaction to send data.

In the case of a "Message Frame", which comprises one or more messages in a single transport frames, the hardware is set up to cause an interrupt simply due to receiving the last (and only if 2 KB frames are supported) data frame (as determined by an end of sequence indicator in a frame header). In typical applications, the interrupt does not occur until a SCSI response frame is received. The particular implementation of the protocol does not use SCSI response frames, so the hardware is capable of interrupting simply on reception of a "last" data frame.

In the "Message Frame" case, a single data frame containing one or more MFCs is processed subject to ordering rules. Once processed the hardware is set up to again respond "like a SCSI read" to the same OX_ID. The other end infers this when it receives acknowledgment for the given "Message Frame". It should be noted that the actual physical buffer used need not be the same. It is only required that the OX_ID identify some specific 2 KB buffer known to the receiving end.

Each IU 602 (or MFC as described above) contains a vector indicating a particular processes on the receiving end that is to handle the IU 602 as well any necessary control information such to indicate the beginning and ending of an IU. Aggregation is particularly useful in sending control information in which each IU 602 may comprise a relatively small number of bytes (e.g., acknowledge messages, negative acknowledge messages, command messages, and status messages) as compared to data transfer messages which typically fill the payload sections more completely.

Figure 7:
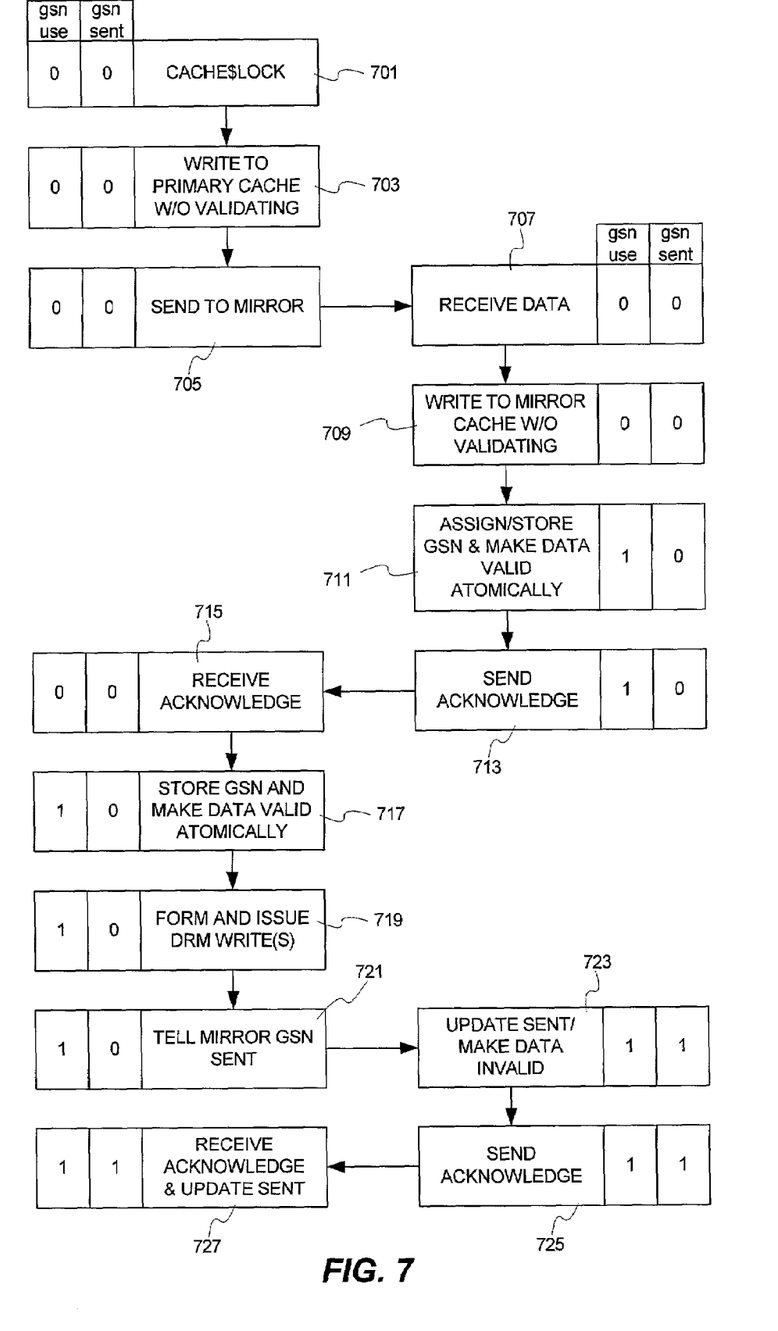
FIG. 7 and FIG. 8 illustrate in flow-diagram form actions performed to execute replicated write operations in accordance with the present invention.
Figure 8:
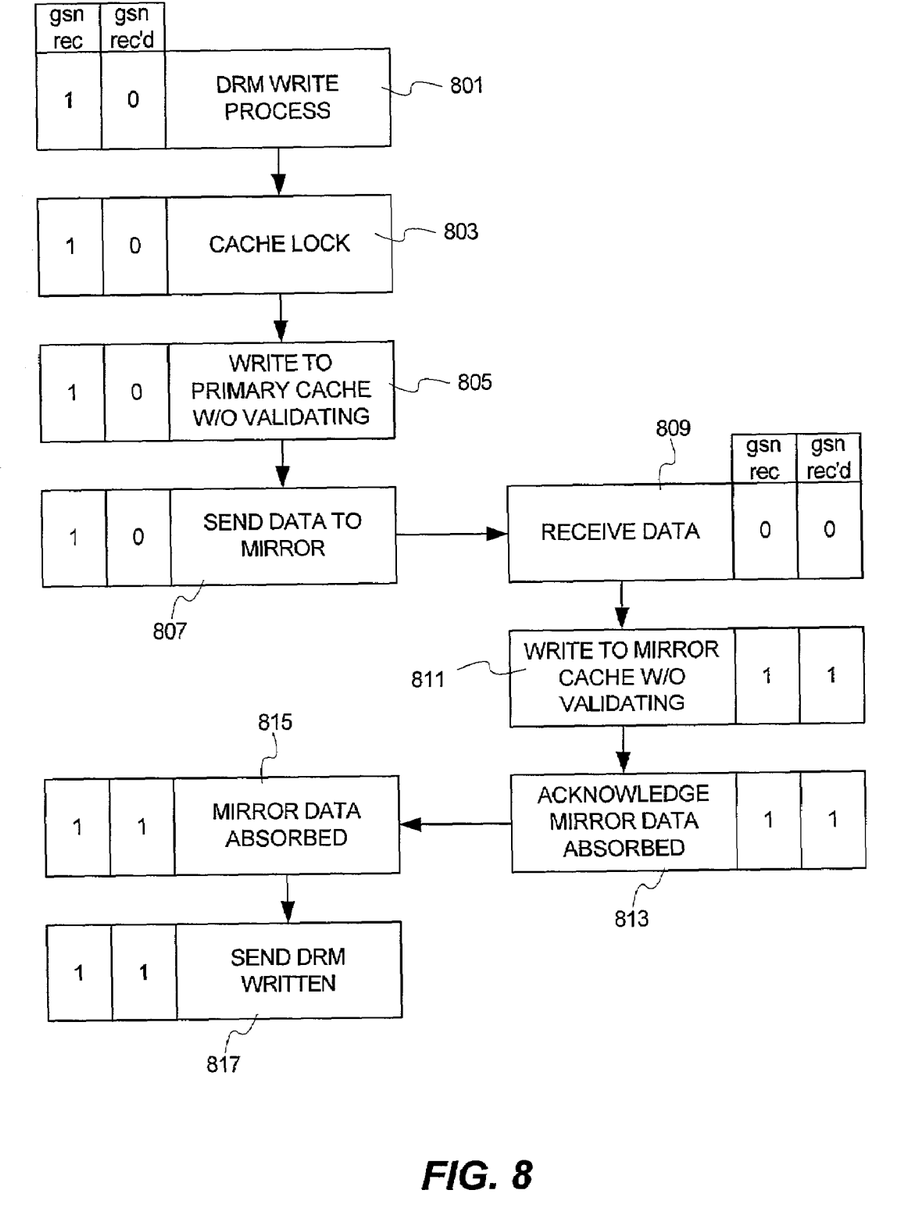

FIG. 7 identifies operations used in a write operation after a data replication group has been created from the perspective of a source controller 105, whereas FIG. 8 illustrates operations involved in the write operation from the destination controller's perspective. The example of FIG. 7 and FIG. 8 involves a single source storage cell 101 having dual, mirroring controllers, and a single destination storage cell 101 having dual mirroring controllers. In a particular implementation, each controller includes 1 GB of cache for a total of 2 GB for the storage cell 101. The cache is divided into read and write data, where the write data is preserved by a battery and mirrored in the redundant controller. As this division is equal between read and write data, there is an effective read cache for the subsystem of 1 GB, and an effective write cache of 256 MB of mirrored cache. Various operations shown in FIG. 7 and FIG. 8 involve interactions with the mirrored cache and would be omitted if mirrored caching were not used in a particular application.

In operation 701, a write request specifying a particular LUN has been received from a host 102. A write operation may in fact involve a series or stream of related write operations. The controller 105 that receives the write request from a host 102 is the designated source controller for the received request. The write operations are presumed to be received by the source in proper order, and the data transfer protocol in accordance with the present invention operates to preserve the order in which the operations are received as the operations are applied to other members of the data replication group.

In operation 701, the mirrored caches are locked to give exclusive access to the processes handling the write operation. As noted before, the write operation may be received in several data transmissions over some period of time. As portions of the write operation are received, they are absorbed into primary cache without validation (i.e., without being marked valid) in operation 703. Once the entire operation is received in the primary cache, it is copied to the mirror cache in operation 705. If an error prevents caching or interferes with copying the operation to the mirror cache, error-handling mechanisms within controller 101 are called the operation of which are beyond the scope of this disclosure. In operation 707, the mirror controller receives the operation into a receive buffer as shown in FIG. 6, and in operation 709 the mirror cache receives the operation. After operation 709, the write operation is securely recorded in two battery backed caches, however it is not yet marked valid (and so can not be used to commit the operation to media-based storage) in either cache.

Two group sequence number variables are maintained for mirroring purposes. A first is the GSN used variable that indicates the highest valued GSN that has been assigned to a valid write/copy operation. The second is the GSN sent variable which indicates the highest valued GSN that has been sent to another (remote) controller for data replication purposes. For simplicity in illustrating how GSNs are incremented, the illustration of FIG. 7 and FIG. 8 uses an initial GSN value of zero. However, the GSN is implemented as a four-byte value that is uniquely assigned to each operation, and is intended to wrap around infrequently if ever.

It is contemplated that GSNs can be reused by resetting the GSN back to zero at opportune times. For instance, when a merge on all destinations is completed, or when the GSN reaches a large value while not logging. Host I/O for the group is quiesced at all sites before the GSN is reset.

In operation 711, a group sequence number (GSN) is associated atomically with the write operation in cache. By atomically it is meant that the GSN can not be assigned to an operation that is incomplete or invalid, and that an operation can not be made valid unless a GSN has been assigned. The GSNs are assigned sequentially in a rigid order. Once a GSN is assigned, the gsn_use counter in the mirror cache is incremented. Hence, if the most recent operation for this group had a GSN=0001, the current operation would be associated with a GSN=0002 and the next operation would be associated with a GSN=0003. In a stream of write operations, each operation is assigned a GSN atomically in the order received.

In operation 713 the mirror cache sends an acknowledge message to the primary controller, which is received at operation 715. The primary controller stores the GSN values from the mirror cache in 717, indicating that the particular GSN has now been used. Step 717 also involves marking the operation as valid in the primary cache so that the GSN becomes associated with the operation atomically in the primary cache.

After step 717, the operation is valid in both the primary and mirror cache and can be used to form data replication operation in step 719. In operation 719, the operation is drawn from cache into one or more transmit buffers (e.g., entries 603 in the transmitting controller). Substantially conventional processes implemented in communication network 103 transport the operation to a corresponding buffer location 603 in a receiving controller. Processing will not continue to operation 721, until the remote write operation completes or fails. The gsn_sent value is not updated unless the associated operation completes to the remote or is redirected to the log (because it failed). If the controller crashes (controller failover) or dual controllers go down, gsn_use and gsn_sent values indicate that this remote write needs to be finished (i.e., reissued to the destination or to the log).

In operation 721, the primary controller sends a message to the mirror controller that the operation corresponding to the GSN has been sent, causing the mirror controller to update its gsn_sent value in operation 723. In operation 725, the mirror controller sends an acknowledgement that the gsn_sent value was updated, which is received in operation 727 by the primary controller thereby causing the primary controller to update its gsn_sent value in operation 727. If a write operation fails, the GSN can be used to identify the particular operation that failed and resend that operation.

Similar operations occur on the destination controller side as shown in FIG. 8. It should be noted that a destination controller tracks the value of the highest GSN received (gsn_rec) and the highest GSN that has been successfully received into its mirror cache (gsn_rec'd). In operation 801, an unsolicited DRM write operation is received from operation 719 in FIG. 7 and the gsn_rec value is incremented. In operation 803, a cache lock operation is executed to lock the locations of the primary and mirror cache that will be used to hold the operation. In 805, the operation is written to the primary cache without validation, then sent to the mirror cache in operation 807.

In operation 809, the mirror cache receives the operation and updates its gsn_rec value. The mirror writes the operation to its cache and validates the operation in 811 so that it can be committed to media-based storage. In operation 811, the gsn_rec'd value in the mirror controller is incremented to indicate that the operation is now stored in non-volatile memory on the receiving controller. Once the write to the mirror cache is successful, the mirror controller sends the primary controller an acknowledge message in operation 813 indicating that the mirror cache operation is successful, and in operation 815, the primary cache updates its gsn_rec'd value to so indicate, and validates its corresponding cache entry. In 817, a DRM_WRITTEN message is sent to the source controller to confirm that the write operation was successful.

The data transfer protocol of present invention includes a heartbeat MFC that is periodically or occasionally transmitted from each controller 101 to each other controller 101 (or from each group object to each other group object in a replication group). The heartbeat message includes the current GSN from the perspective of that group object, which is the highest used GSN that was registered earlier. The heartbeat message is independent of any write operations, and the frequency at which they are set is adaptive to meet the needs of a particular application. When a group object receives a heartbeat message it 1) knows the controller that sent the heartbeat message is functioning, 2) the tunnel to the controller that send the heartbeat message is functioning, and 3) the current GSN of the group object in the sending controller.

Figure 9:
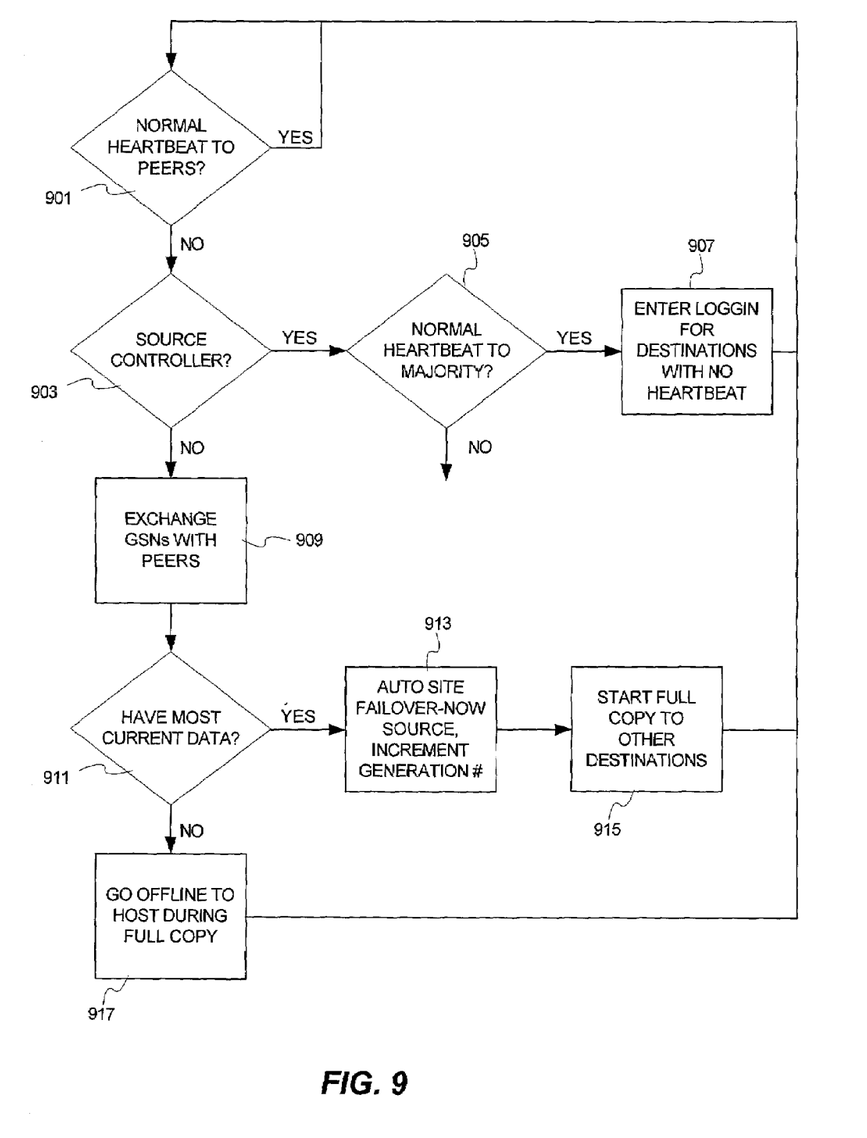
FIG. 9 conveys in flow-diagram form operations involved in a managing a heartbeat protocol message in accordance with the present invention.

FIG. 9 illustrates operation of a heartbeat system in accordance with the present invention. The heartbeat system serves multiple purposes such as detecting failed controllers or transmission links, monitoring latency and/or quality of service between controllers, and to more quickly detect operations that are dropped in transmission. The present invention includes mechanisms to detect dropped fibre channel frames more quickly than in the case of a SCSI over fibre channel protocol, for example. The fibre channel protocol enables detection of a dropped data frame upon receipt of the command frame as the block count, for example, will not match. Moreover, frames may include error detection codes to indicate damage. Receipt of a damaged frame also lets the recipient know implicitly that a frame has been dropped. When a command frame is dropped, the recipient may not be able to detect the drop until the next command frame arrives.

In an SAN environment, waiting for the arrival of a subsequent command frame can take a substantial amount of time. The protocol in accordance with the present invention includes "heartbeat" or "ping" messages that are transmitted from the source to each destination following transmission of a frame carrying the command information. These heartbeat messages are formatted as extended link service (ELS) fibre channel frames and carry immediate data indicating the group sequence number of the GSN of the most recently transmitted operation. The heartbeat frames are preferably transmitted at regular intervals such as once per second from controllers at each end of a tunnel, and will result in an ELS acknowledge response from the destination back to the source. The interval for sending heartbeat frames does not need to be fixed or regular, and may be adapted to balance overhead with performance by increasing the interval to reduce overhead or decreasing the interval to speed detection of dropped frames.

The round trip time for the heartbeat request/response exchange is monitored and used to define a time-out interval. The time-out interval can be defined as a the average, moving average, or instantaneous round trip time, or may be a multiple of that value (e.g., 1.5×round trip time), or otherwise computed from the round trip time (e.g., round trip time+100 ms). When a controller does not receive either a heartbeat response message or a heartbeat message from the controller on the other side of a tunnel within the currently defined time-out interval, the tunnel is assumed to have collapsed or failed and is irrevocably closed.

In practice, a tunnel connecting a source controller 105 and a destination controller 105 may hold several outstanding write operations. Once each write operation's command frame has been transmitted, repeated heartbeat frames are sent containing the GSN for the operation's command frame. In this manner, the destination controller can detect a missing command frame very quickly after the command frame was sent, and does not need to wait for a subsequent command frame to arrive. A dropped data frame will be detected when the command frame is received. A dropped command frame will be detected when the heartbeat message is received. The destination controller can send a request to retransmit any operations corresponding to GSNs that were received in heartbeat messages, but for which it has not received the complete transmission of data and command frames.

In operation 901, a normal heartbeat is generated to peers on a regular or variable schedule. The heartbeat includes the current GSN. Each peer acknowledges receipt of the heartbeat with either a response indicating a normal condition (i.e., the received GSN was not inconsistent with that peer's GSN, or with an "abnormal" response indicating that a frame sequence was found to be missing). The abnormal response received in operation 903 preferably includes a specific indication of the GSNs that are missing, giving the source enough information to replay or resend the missing data operations. The heartbeat process 901 continues in parallel with other data replication operations and so is schedule to not create undue overhead that might impact normal delivery of replicated data.

In the event a heartbeat is not acknowledged, the controller may, but is not required to take remedial action as this situation might indicate a link or controller failure. This remedial action leads to operation 907 in which the system logs all data operations for which it is a source controller for each destination controller that is not responding to the heartbeat. The logged operations, which track operations in order of GSN, can be played back as soon as the destination begins to respond again to the heartbeat. During this playback, if a controller receives an operation associated with a GSN that has already been processed, the receiving controller can discard the operation.

When the controller issuing the heartbeat message is not a source controller, it exchanges GSNs with the other peers in the data replication group in 909. If it has the most current data as indicated by the largest-value GSN in operation 911, it will initiate action to cause the group to automatically failover in operation 913, so as to make the controller with the highest GSN the source for this group. Then, the new source controller begins a full copy in operation 915 to other destinations until all peers have the same GSN record. Operation 915 may involve sending differing sets of data operations to various destination controllers depending on what data each controller is missing. When the controller does not have the most current data, control passes to operation 917 where it remains a destination controller and awaits write/copy operations from another peer controller that has the most current data.

When an abnormal response is received in 903, the controller determines if it is the source for the operations associated with the missing GSNs. Normally, it is preferred that the controller that acted as the source for a particular transmission be responsible for resending the data operations that were not delivered. In operation 905, the source controller determines whether a normal heartbeat has been received from a majority of peers. Operation 905 is only meaningful in a multidirectional system with three or more storage cells implementing peers. When the majority of destination controllers return normal heartbeat acknowledgement, the controller begins logging for the destinations with abnormal responses for later synchronization in 907.

As described above, the storage system may be adapted to support two or more destination replication systems. This is illustrated with reference to FIG. 10, in which a host computer 1010 executes writes that are directed to an exemplary DRM group having a source storage system 1015 in Colorado, which maintains redundant copies in destination storage systems 1020a in Japan, 1020b in New York, and 1020c in Houston. If any one (or more than one) of the destination systems in the DRM group becomes inaccessible, then the source controller in the system in Colorado initiates a data logging procedure in which write operations from the host computer 1010 are stored in a separate virtual disk reserved for a data log. The data log stores the GSN associated with each write entry in the data log.

Figure 10:
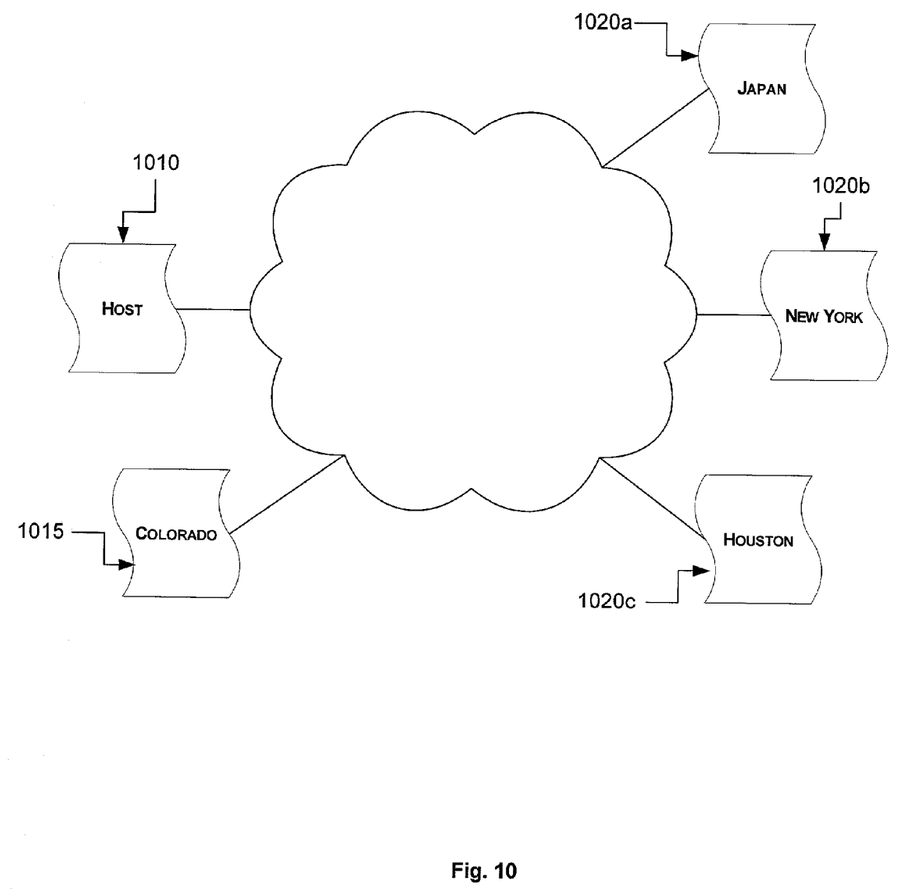
FIG. 10 is a schematic depiction of a storage area network having multiple destinations.

When one (or more) of the destination systems 1020 comes back online the controller in the source data storage system 1010 in Colorado initiates a merge function to write the data stored in the log to the destination system(s).

In one aspect, a storage system in accordance with the present invention implements several features to facilitate reconciling data copies stored at various locations in the network. In one embodiment, the source storage system 1015 in Colorado may implement a concept referred to as a "merge fence" to manage the merge process. The merge fence indicates which write entry is being merged. In an exemplary embodiment, the merge fence may be based on the GSN. When the merge is initiated the merge fence is set to the lowest GSN of all logging destinations that are presently online (i.e., accessible) Merge writes are then started from that entry. If another destination comes online and is added to the merge, then the merge fence will be reset, again to the lowest GSN of the logging destinations that are currently online. As the merge process is executed, the merge data is transmitted to each destination that includes a GSN equal to the merge fence. By contrast, if a destination's GSN is above the merge fence, then the write is skipped.

A multi-destination merge, in which all online destinations are merged as described above, may be an efficient mechanism for reconciling multiple volumes of data following the failure of one or more heartbeats. However, in some circumstances it may be desirable to permit a user to select a sequence for merging destination data sets. For example, one or more destinations may have a higher performance connection, and the user may wish to replicate the data to the high performance sites first.

In an exemplary embodiment, the system may use Suspend and Resume commands to implement a selectable merge order on a per-group basis. In operation, a user may instruct the system to issue a Suspend command to the source (or primary) controller. The Suspend command causes the source controller to initiate logging for all members of a DRM group. The Resume command initiates merging on all the group members. If a user wants a particular set of DRM groups to have a higher priority than other sets of DRM groups, then the user may selectively issue resume commands for DRM groups in the order of their respective priority, and the merges will be executed in accordance with the priority desired by the user.

Although the above description refers to specific embodiments of the invention, the invention is not necessarily limited to the particular embodiments described herein. It is to be understood that various other adaptations and modifications may be made within the spirit and scope of the invention as set forth in the appended claims.

What is claimed is:

1. A method for writing information in a data log to one or more destinations in a storage network, wherein the data log is generated by a source controller in response to a failure of one or more destinations in the storage network, and wherein each write I/O from a host computer is assigned a group sequence number that is stored with a data entry corresponding to the write I/O, the method comprising:

setting a merge fence to the lowest group sequence number of the destination databases;

writing entries from the data log, beginning at the merge fence, to each active destination and for which the lowest group sequence number is equal to the merge fence; and incrementing the merge fence after each write.

2. The method of claim 1, further comprising merging data from the data log with data previously stored in the destination storage system to return the data to a consistent state.

3. The method of claim 1, wherein the host computer continues to write data from the host computer to the data log while information is written from the data log to the one or more destinations.

4. The method of claim 1, wherein the data log comprises a storage set treated as a logical unit by the source controller.

5. The method of claim 1, wherein data written from the data log is stored in cache memory in a source controller in transaction order.

6. The method of claim 1, wherein entries from the data log are written by the source controller in synchronous mode.

7. The method of claim 1, wherein data written by the source controller is written in asynchronous mode.

8. The method of claim 1, wherein the merge fence is reset if a destination with a group sequence number lower than the current group sequence number comes online during the write process.

9. A computer program product embodied in a computer readable storage medium for use in connection with a processor for writing information in a data log to one or more destinations in a storage network, wherein the data log is generated by a source controller in response to a failure of one or more destinations in the storage network, and wherein each write I/O from a host computer is assigned a group sequence number that is stored with a data entry corresponding to the write I/O, comprising logic instructions stored in a computer-readable medium which, when executed by a processor, configure the processor to:

set a merge fence to the lowest group sequence number of the destinations;

write entries from the data log, beginning at the merge fence, to each active destination for which the lowest group sequence number is equal to the merge fence; and increment the merge fence after each write.

10. The computer program product of claim 9, further comprising logic instructions stored in a computer-readable medium which, when executed by a processor, configure the processor to process write data from the host computer written to the data log while data is written from data log to the one or more destinations.

11. The computer program product of claim 9, further comprising logic instructions stored in a computer-readable medium which, when executed by a processor, configure the processor to reset the merge fence if a destination with a group sequence number lower than the current group sequence number comes online during the write process.

12. The computer program product of claim 11, further comprising logic instructions stored in a computer-readable medium which, when executed by a processor, configure the processor to receive data written from the host computer while merging is being performed.

* * * * *

UNITED STATES PATENT AND TRADEMARK OFFICE
CERTIFICATE OF CORRECTION

PATENT NO. : 7,149,769 B2
APPLICATION NO. : 10/106907
DATED : December 12, 2006
INVENTOR(S) : Clark Lubbers et al.

It is certified that error appears in the above-identified patent and that said Letters Patent is hereby corrected as shown below:

In column 10, line 34, delete ""$gsn_{13}$ received"" and insert -- "gsn_received" --, therefor.

In column 10, line 52, delete "($OX_{13}$ IDs)" and insert -- (OX_IDs) --, therefor.

Signed and Sealed this

Twenty-seventh Day of July, 2010

David J. Kappos
*Director of the United States Patent and Trademark Office*